H. L. BEACH.
CONTROL SYSTEM FOR ELECTRIC MOTORS.
APPLICATION FILED JUNE 9, 1914.

1,157,203.

Patented Oct. 19, 1915.

WITNESSES:
G. J. Fitzgerald.
J. R. Langley.

INVENTOR
Howard L. Beach.
BY
Wiley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,157,203.  Specification of Letters Patent.  Patented Oct. 19, 1915.

Application filed June 9, 1914. Serial No. 843,915.

*To all whom it may concern:*

Be it known that I, HOWARD L. BEACH, a citizen of the United States, and a resident of Edgewood Park, in the county of Allegheny and State of Pennsylvania, have invented a new and useful Improvement in Control Systems for Electric Motors, of which the following is a specification.

My invention relates to control systems for electric motors and it has particular reference to such systems as embody motors that are adapted to operate at variable speed.

My invention has for its object to provide a simple and efficient means for automatically controlling the acceleration of an electric motor by varying the voltage of its supply circuit.

With few exceptions, the many systems for controlling the acceleration of electric motors that have been proposed hitherto, include a sectional resistor and a number of switches for controlling it. While this form of control may be necessary in some installations, it has been found that the same results may be obtained by other and simpler means when it is possible to control the voltage of the source of energy. For example, in the operation of paper machines or similar mechanisms which are driven by single motors that are supplied with energy by separate generators located adjacent to the motors, the voltage of the generator may be varied to control the acceleration of the motor.

I provide a system in which the usual large starting resistor and the controlling switches therefor may be replaced by two relay switches. The voltage of the generator and the field excitation of the motor are automatically controlled in accordance with the acceleration of the motor.

Figure 1:
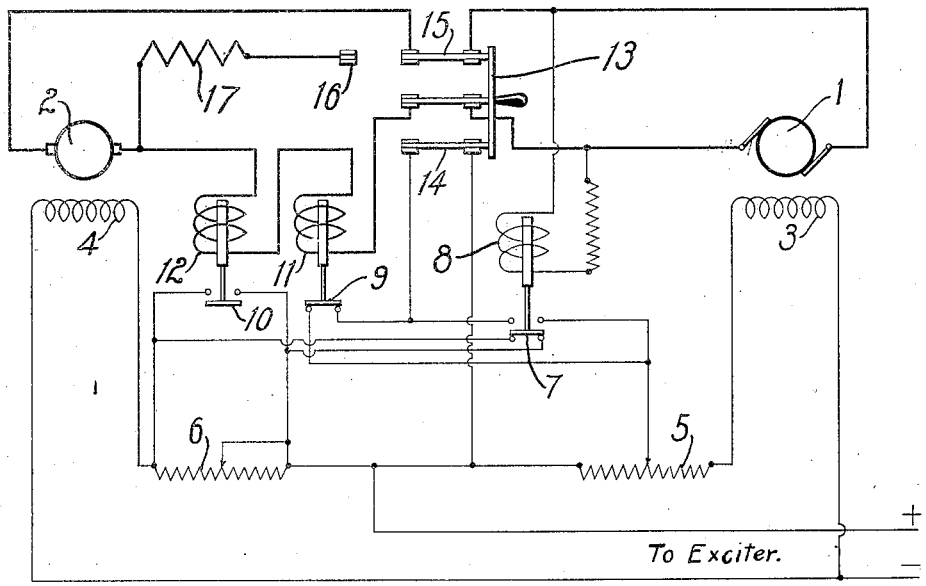
Figure 2:
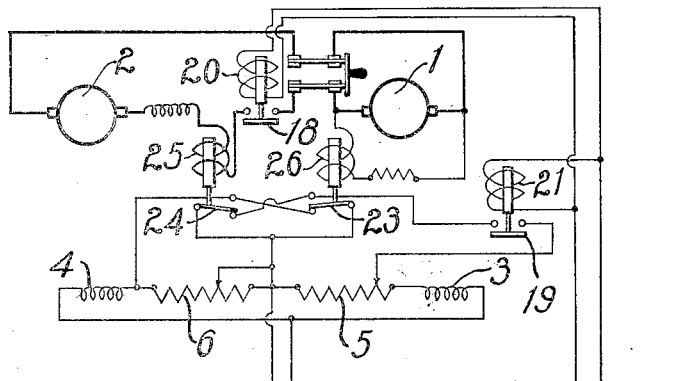

In the accompanying drawings, Figure 1 is a diagrammatic view of circuits and apparatus embodying my invention. Fig. 2 is a view, similar to Fig. 1, of a modification.

A generator 1 is connected in series with a motor 2 to which it supplies energy. The generator 1 and the motor 2 are respectively provided with field windings 3 and 4 that are separately excited by any suitable source of energy at constant voltage. The excitation of the field windings 3 and 4 may be controlled by variable resistors 5 and 6 which may be adjusted to produce any desired field strength. The resistors 5 and 6 are controlled by an electromagnetic switch 7 having an actuating coil 8. that is connected across the terminals of the generator, and by electromagnetic switches 9 and 10, whose coils 11 and 12 are in series with the armature windings of the motor 2. A three-pole double-throw switch 13, which may, if desired, be replaced by electromagnetic switches, operates to control the main circuit.

It may be assumed that the system above described, which has been in operation at the desired speed, is stationary, and that it is desired to start the motor and cause it to operate at the same speed as before. Before the main switch 13 is closed, the voltage of the generator will be low because the resistor 5 is in series with the field windings 3. The switch 7 is in its lower position, and the switches 9 and 10 are respectively in closed and in open positions since the motor circuit is open. When the switch 13 is closed, the switch blade 14 completes a circuit which includes the switch 9 for shunting the resistor 5. The consequent rise in generator voltage because of the increased excitation of the field windings 3 causes a rush of current in the main circuit. The coil 11 is energized to open the switch 9 and thereby remove the shunt for the resistor 5 and thus decrease the voltage of the generator. The switch 9 then oscillates in the same manner as the well known field-accelerating or "fluttering" relay to bring the generator voltage gradually up to its full value. When the generator voltage reaches its normal value, the coil 8 will be sufficiently energized to raise the switch 7 which, in its lower position, has completed a shunt for the resistor 6, thereby insuring a strong field for the motor 2 in starting. The operation of the switch 7 serves to remove the shunt for the resistor 6, and the motor field is accordingly weakened. A rush of current occurs in the main circuit, and the coil 12 is energized to close the switch 10 and thus complete a shunt circuit for the resistor 6.

When the motor has been accelerated to such a speed that the current traversing the main circuit falls to a predetermined value, the coil 12 is sufficiently deënergized to allow the switch 10 to open and thereby insert the resistor 6 in series with the field windings 4 to weaken the field of the motor. A rush of current in the main circuit will follow the opening of the switch and the coil 12 will be sufficiently energized to again close the switch 10 which will oscillate, in the same manner as that described in connection with the switch 9, to gradually accelerate the motor to its normal running speed with the resistor 6 in series with the field windings 4.

When it is desired to stop the motor, it is only necessary to reverse the position of the switch 13, whereupon the switch blade 15 will engage a contact member 16 to close a dynamic braking circuit for the motor, through a suitable resistor 17, and the motor will be brought to rest safely and quickly.

It will be noted that, in the above system, it is impossible to connect the motor to the generator when the generator voltage is high or when the motor field is weak. It is also impossible to close the dynamic braking circuit while the motor is connected to the generator.

A modification is illustrated in Fig. 2 in which similar numerals are employed to designate corresponding parts. A main switch 18 and a switch 19 for controlling a shunt circuit for the resistor 5 are respectively provided with actuating coils 20 and 21 that are controlled by a snap switch 22. The double-throw switches 23 and 24, which control the shunt circuits for the resistors 5 and 6, are in their lower positions when the system is not in operation. The resistor 6 is short circuited, thus insuring a strong field for the motor 2 in starting.

When the switch 22 is closed, the coils 20 and 21 are energized to close the switches 18 and 19. When the switch 19 closes, a short circuit is completed for the resistor 5. The voltage of the generator is accordingly increased, and a rush of current occurs in the main circuit. The coil of the switch 24 is sufficiently energized to raise the switch to open a shunt circuit for the resistor 5 and thereby decrease the field excitation of the generator 1. The switch 24 then drops to its lower position to again complete the shunt circuit for the resistor and cause a second rush of current in the main circuit. The switch 24 then operates as a "fluttering" relay to gradually bring the generator voltage to its normal value. When the generator voltage reaches a predetermined value, the coil 26 of the switch 23 is sufficiently energized to raise the switch to its upper position to maintain a shunt circuit for the resistor 5 and to open the shunt circuit for the resistor 6. The resulting weakening of the motor field causes a rush of current in the main circuit, and the switch 24 is raised to complete a shunt circuit for the resistor 6. The switch 24 then operates as a "fluttering" relay to further accelerate the motor.

When the motor has reached such a speed that the current received by its armature windings has fallen to a predetermined value, the coil 25 is sufficiently deënergized to permit the switch 24 to remain open, with the resistor 6 in series with the field winding 5.

It will be noted that I provide a system in which the usual starting resistors and the controlling switches therefor may be omitted. The usual field rheostats may be adjusted for such a generator voltage and such an excitation of the motor field winding as will produce the desired speed. It is only necessary, therefore, when this adjustment has been made, to open and close the main switch to cause the motor to be automatically accelerated to the same speed which it had before it was stopped.

My invention may be used with particular advantage in connection with mechanisms where frequent stops are necessary and it is desirable to operate at the same normal speed without adjustments at each time of starting.

I claim as my invention:

1. In a motor control system, the combination with a motor, and a generator for supplying energy to the motor, of a plurality of electromagnetic switches operating at a predetermined value of current supplied to said motor for gradually increasing the generator voltage to a normal value and then gradually decreasing the field excitation of said motor.

2. In a motor control system, the combination with a motor, and a generator in circuit therewith, of automatic means for gradually increasing the voltage of the generator to a normal value and then gradually decreasing the field excitation of said motor.

3. In a motor control system, the combination with a generator and a motor connected in series relation, of means operating at a predetermined voltage of said generator for controlling the field excitation of the motor, and means operating in accordance with the value of the current supplied to said motor for controlling the voltage of the generator.

4. In a motor control system, the combination with a generator and a motor connected in series relation and provided with field windings and resistors in circuit with said windings, of means controlled in accordance with the voltage of said generator for controlling said resistors.

5. In a motor control system, the combination with a generator and a motor connected in series relation and provided with separately excited field windings, of means operating at a predetermined value of the generator voltage for controlling the excitation of the generator field winding, and means operating at a predetermined value of the current supplied to said motor for controlling the excitation of the motor field winding.

6. In a motor-control system, the combination with a generator and a motor connected in series relation, of means operating at a predetermined voltage of said generator for controlling the field excitation of the motor.

In testimony whereof, I have hereunto subscribed my name this 26th day of May 1914.

HOWARD L. BEACH.

Witnesses:
ORA A. COLBY,
B. B. HINES.